United States Patent
Goulet

(10) Patent No.: US 8,942,357 B2
(45) Date of Patent: Jan. 27, 2015

(54) STOPPING ROBOCALLS

(71) Applicant: Mary Elizabeth Goulet, McLean, VA (US)

(72) Inventor: Mary Elizabeth Goulet, McLean, VA (US)

( * ) Notice: Subject to any disclaimer, the term of this patent is extended or adjusted under 35 U.S.C. 154(b) by 0 days.

(21) Appl. No.: 14/057,103

(22) Filed: Oct. 18, 2013

(65) Prior Publication Data

US 2014/0112459 A1    Apr. 24, 2014

Related U.S. Application Data

(60) Provisional application No. 61/717,052, filed on Oct. 22, 2012.

(51) Int. Cl.
*H04M 1/64* (2006.01)
*H04M 3/436* (2006.01)
*H04M 3/42* (2006.01)

(52) U.S. Cl.
CPC ..................... *H04M 3/436* (2013.01)

USPC .................................. 379/88.01; 455/415

(58) Field of Classification Search
USPC .................... 379/210.02, 210.03; 455/415
See application file for complete search history.

(56) References Cited

U.S. PATENT DOCUMENTS

| | | | |
|---|---|---|---|
| 8,325,893 B2 * | 12/2012 | Vendrow | 379/189 |
| 2004/0131164 A1 | 7/2004 | Gould | |
| 2006/0210032 A1 | 9/2006 | Grech et al. | |
| 2007/0026372 A1 * | 2/2007 | Huelsbergen | 434/322 |
| 2010/0158233 A1 * | 6/2010 | Caceres et al. | 379/207.02 |
| 2011/0159856 A1 | 6/2011 | Walsh et al. | |
| 2013/0216027 A1 * | 8/2013 | Rados et al. | 379/32.01 |

* cited by examiner

*Primary Examiner* — Fan Tsang
*Assistant Examiner* — Solomon Bezuayehu
(74) *Attorney, Agent, or Firm* — Whitham Curtis Christofferson & Cook, PC

(57) ABSTRACT

A robocall is prevented from reaching a telephone subscriber, by an automated calling screening system that tests for presence of a human caller on the line, and disconnects calls absent a predetermined response indicating presence of a human caller.

6 Claims, 2 Drawing Sheets

STOPPING ROBOCALLS

FIELD OF THE INVENTION

The invention relates to preventing an unwanted robocall from disturbing a telephone subscriber who does not want to receive a robocall.

BACKGROUND OF THE INVENTION

Robocalls (automated telephone calls conducted by a computerized system rather than by a human caller) generally are unwanted by the recipients.

Generally speaking, and not necessarily addressing robocalls, certain automated call screening systems have been disclosed in the patent literature:

US Pat. Pub. 20040131164 by Gould, for "Method and apparatus for automated telephone call screening," published Jul. 8, 2004;

US Pat. Pub. 20060210032 by Grech et al. (Lucent Technologies, Inc.), for "Multilevel dynamic call screening," published Sep. 21, 2006;

US Pat. Pub. 20110159856 by Walsh et al. (Oto Technologies, LLC), for "Apparatus and method of location based telecommunication authorization," published Jun. 30, 2011.

However, people continue to be bothered by robocalls. There remains an unmet need for automated systems that stop robocalls from disturbing a telephone subscriber who does not want to receive a robocall.

SUMMARY OF THE INVENTION

The above-mentioned problems are addressed by a method, performed by an automated system comprising at least one computer, of preventing a robocall from reaching a telephone subscriber, comprising steps of before an incoming telephone call is permitted to ring through to a telephone subscriber, pre-answering the incoming call, performed by the automated system; delivering an audio message (such as, e.g., an audio message that comprises a message along the lines of "this telephone subscriber does not receive robocalls; are you a human caller?") which a human caller would be likely to be able to answer successfully but would be likely to be unanswerable by a non-human; disconnecting the incoming call unless the automated system receives a predetermined response pattern; and processing the incoming call for ring-through to the telephone subscriber if and only the predetermined response pattern has been received; such as, e.g., inventive methods further comprising a step of permitting a predefined time to pass, and if a predefined response (such as, e.g., a predefined response of "Y" or "YES") has not been received back by the automated system, then the automated system disconnects the call; inventive methods wherein the steps are bypassed and not performed for telephone numbers that are indexed and/or saved under names by the telephone subscriber; inventive methods comprising culture-based questioning, wherein the audio message comprises a culture-based question; and other inventive methods.

The invention in another embodiment provides a method of preventing a robocall from reaching a telephone subscriber, by operating an automated calling screening system that tests for presence of a human caller on the line, and, before ringing through to the subscriber, disconnects calls absent a predetermined response indicating presence of a human caller.

In another embodiment, the invention provides an automated system comprising: a stored set of audio messages, wherein an audio message comprises a question that is designed to be answerable by a human but to defeat a robocalling system; a processor, processors, computer or computers that perform steps of: pre-answering a call directed to a telephone subscriber; delivering, onto the line of the pre-answered call, an audio message from the stored set of audio messages; and screening the line of the call onto which the audio message has been delivered, for whether a predetermined response is detected, and, if the predetermined response is not detected, disconnecting the call before the call is permitted to ring-through to the telephone subscriber.

DETAILED DESCRIPTION OF PREFERRED EMBODIMENT OF THE INVENTION

Figure 1:
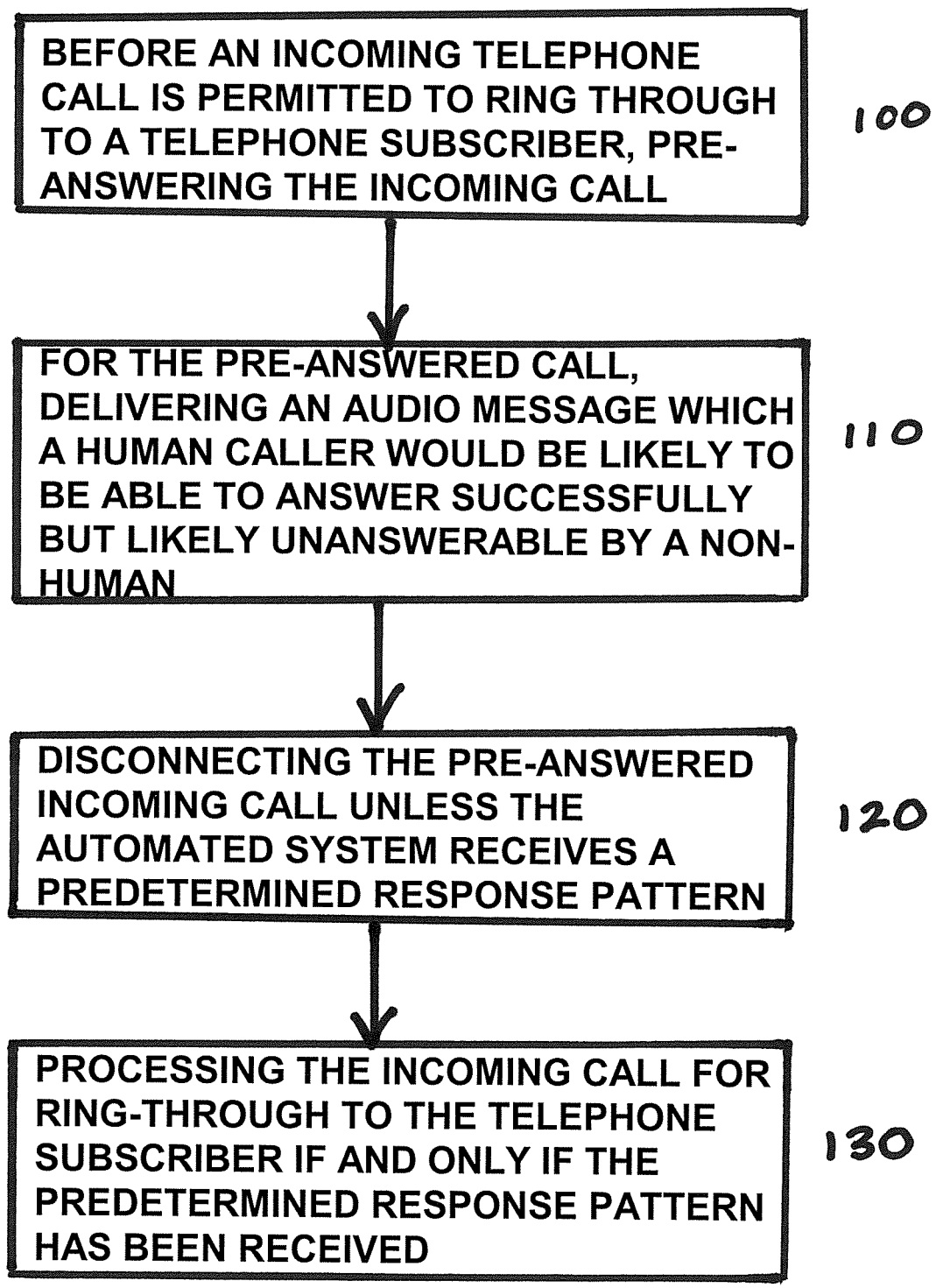
FIG. 1 depicts a flow chart of an embodiment of an inventive method in which each step shown is performed by a computer or machine in an automated system such as automated system 200.

The inventive method of preventing a robocall (such as call 2 generated by computer system 20 in FIG. 2) from reaching a telephone subscriber (such as, e.g., a landline telephone subscriber; a cellular telephone subscriber) is performed by an automated system (such as automated system 200) comprising at least one computer, preferably an automated system that tests for a machine-readable predefined response (such as, e.g., a predefined response which is a predefined sequence of pushed telephone pad buttons).

An example of a machine-readable predefined response is a particular predefined sequence associated with certain pushed telephone keypad buttons, such as, e.g., a machine-readable signal that a "9" button has been pushed representing "Y" for "Yes" as opposed to no button having been pushed or a response associated with a "6" button meaning "N" for "No"; a machine-readable signal that an "8" button has been pushed representing "T" for "True" as opposed to no button having been pushed or a response associated with a "3" meaning "F" for "False".

The automated system preferably performs a step, before an incoming telephone call is permitted to ring through to a telephone subscriber, of pre-answering 100 the incoming call.

For the pre-answered call, the automated system preferably performs a step of delivering 110 an audio message which a human caller would be likely to be able to answer successfully but would be likely to be unanswerable by a non-human.

An example of the audio message is an audio message that comprises a message along the lines of "this telephone subscriber does not receive robocalls; are you a human caller?" which a human caller would be expected to answer by pressing "Y" or the "Y-E-S" keys.

Another example of the audio message is an audio message that comprises a culture-based question that a human caller would be expected to be able to answer in a predefined manner that would be outside a machine's capability to produce.

Preferably the automated system screens for whether a predetermined response pattern has been received and performs a step of disconnecting 120 the incoming call unless the automated system has received the predetermined response pattern. Preferably the automated system permits a predefined time to pass, and if a response that has been predetermined as indicating a human caller's likely presence has not been received back by the automated system, then the automated system disconnects the call. Preferably the automated system checks for whether the predetermined response pattern has been received too quickly, such as receipt of a premature "Y" response which could have been sent by a preprogrammed robocall.

Figure 2:
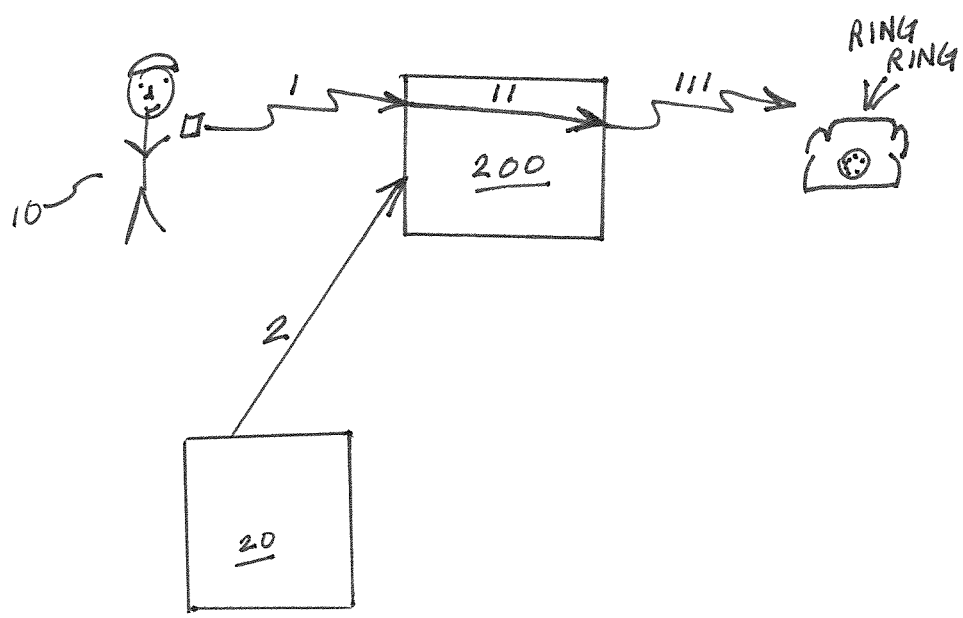
FIG. 2 is a block diagram of an embodiment of an inventive automated system 200 in operation.

For example, human caller 10 in FIG. 2 generates call 1 which is pre-answered by automated system 200. The human call 10 listens to the audio messages delivered by the automated system 200 and gives the predetermined responses and the processed call 11 exits the as a rung-through call 111. By contrast, robocall 2 generated by robocalling system 20 is pre-answered by automated system 200, but cannot make it out of automated system 200 to be rung-through.

Preferably a question that is to be delivered by the automated system 200 is pre-tested against another automated system comprising a voice recognition system, for whether the question is machine-answerable, before being added to the stored questions that the automated system asks when pre-answering calls.

The automated system processes 130 the incoming call for ring-through to the telephone subscriber if and only the pre-determined response pattern has been received. If the predetermined response pattern was not received, the incoming call would have been disconnected in the disconnecting step 120 and would not be susceptible of ring-through processing 130.

Preferably the steps 100, 110, 120, 130 are bypassed and not performed for telephone numbers that are indexed and/or saved under names by the telephone subscriber.

EXAMPLE 1

An example of culture based questioning presentable in an inventive audio message is, e.g., "Press the "Y" or "N" key to indicate for the following activities that will be mentioned whether each is an activity that our current president is likely to be seen doing today: riding a motorcycle; jumping out of a helicopter; hitch-hiking; shaking hands; giving a speech . . . ".

EXAMPLE 1A

The predefined responses stored by the automated system for the culture-based questions of Example 1 are:
riding a motorcycle—N (6)
jumping out of a helicopter—N (6)
hitch-hiking—N (6)
shaking hands—Y (9)
giving a speech—Y (9)

As the automated system delivers each question, if no response or a response other than the predefined response is detected by the automated system, the automated system disconnects the call and thus the disconnected call (such as, e.g., a disconnected robocall) does not ring through to the telephone subscriber to disturb her.

In an event that a human caller has been disconnected by the automated system, the human caller can re-dial.

EXAMPLE 1B

Further examples of questions useable in the invention are questions in a form of:
During a job interview would you _____ ? (such as, e.g., shake hands?; spit?);
Are _____ and _____ (such as, e.g., Mickey Mouse and Homer Simpson) in the same cartoon/show?;
Is _____ (such as, e.g., throwing eggs at the White House; declaring bankruptcy; avoiding illegal drugs) good for one's security clearance?;

Does McDonald's sell _____ (e.g., Big Macs; computers; construction equipment)?;
Have _____ (e.g., rotary telephones; hot air balloons; flying cities) been invented yet?

EXAMPLE 2

An automated system stores a large number (such as, e.g., over 100) questions considered not readily answerable in real-time by a machine, along with a predefined response for each question. For each phone call that is pre-answered by the automated system, the automated system selects a set of questions, which is a randomized set of questions that differs from call to call. The automated system performs a randomization step preparatory to constructing a set of questions to ask when pre-answering a call.

EXAMPLE 2A

The automated system is updated frequently (such as, e.g., weekly, daily, etc.) to add new questions and/or to remove questions.

EXAMPLE 2B

The questions are stored in the automated system in a form of prerecorded audio, recorded by a variety of different individuals speaking with different accents and/or dialects.

While the invention has been described in terms of a preferred embodiment, those skilled in the art will recognize that the invention can be practiced with modification within the spirit and scope of the appended claims.

What I claim as my invention is:

1. A method of preventing a robocall from reaching a telephone subscriber, comprising:
   An automated system pretesting a question against other system, wherein the other system comprising a voice recognition system, for whether the question is machine-answerable;
   the automated system playing the question and analyzing a response; if the response is not the expected answer, the automated system designates the question machine-unanswerable and adding the question to a set of stored questions to be asked by the automated system;
   before an incoming telephone call is permitted to ring through to a telephone subscriber, pre-answering the incoming call, performed by the automated system;
   delivering an audio message which a human caller would be likely to be able to answer successfully but would be likely to be unanswerable by a non-human; wherein the audio message comprises a message along the lines of "this telephone subscriber does not receive robocalls; are you a human caller?";
   disconnecting the incoming call unless the automated system receives a predetermined response pattern;
   processing the incoming call for ring-through to the telephone subscriber if and only the predetermined response pattern has been received by the automated system.

2. The method of claim 1, including permitting a predefined time to pass, and if a response of "Y" or "YES" has not been received back by the automated system, then the automated system disconnects the call.

3. A method of preventing a robocall from reaching a telephone subscriber, comprising:

An automated system pretesting a question against other system, wherein the other system comprising a voice recognition system, for whether the question is machine-answerable;

the automated system playing the question and analyzing a response; if the response is not the expected answer, the automated system designates the question machine-unanswerable and adding the question to a set of stored questions to be asked by the automated system;

before an incoming telephone call is permitted to ring through to a telephone subscriber, pre-answering the incoming call, performed by the automated system;

delivering an audio message which a human caller would be likely to be able to answer successfully but would be likely to be unanswerable by a non-human; comprising culture-based questioning, wherein the audio message comprises a culture-based question;

disconnecting the incoming call unless the automated system receives a predetermined response pattern;

processing the incoming call for ring-through to the telephone subscriber if and only the predetermined response pattern has been received by the automated system.

4. The method of claim 3, wherein the stored questions comprise a question in a format "Press the Y or N key to indicate for the following activities that will be mentioned whether each is an activity that our current president is likely to be seen doing today".

5. The method of claim 3, wherein the stored questions comprise a question in a format selected from the group consisting of:

"During a job interview, would you . . . ?";

"Are A and B in the same cartoon show?";

"Is X good for one's security clearance?";

"Does McDonald's sell Y?";

"Have Z been invented yet?"

6. A method of preventing a robocall from reaching a telephone subscriber, comprising:

An automated system pretesting a question against other system, wherein the other system comprising a voice recognition system, for whether the question is machine-answerable;

the automated system playing the question and analyzing a response; if the response is not the expected answer, the automated system designates the question machine-unanswerable and adding the question to a set of stored questions to be asked by the automated system; wherein the stored questions are in a form of prerecorded audio, recorded by a variety of different individuals speaking with different accents and/or dialects;

before an incoming telephone call is permitted to ring through to a telephone subscriber, pre-answering the incoming call, performed by the automated system;

delivering an audio message which a human caller would be likely to be able to answer successfully but would be likely to be unanswerable by a non-human;

disconnecting the incoming call unless the automated system receives a predetermined response pattern;

processing the incoming call for ring-through to the telephone subscriber if and only the predetermined response pattern has been received by the automated system.

* * * * *